Patented Apr. 28, 1953

2,636,900

UNITED STATES PATENT OFFICE 2,636,900

PROCESS FOR THE PURIFICATION OF ORTHO-HYDROXYBENZAMIDE

Paul Rambacher, Nussdorf (Inn), and Johannes Miksch, Pfraundorf, Rosenheim (Upper Bavaria), Germany, assignors to Aschaffenburger Zellstoffwerke, Aktiengesellschaft, Redenfelden, Post Raubling (Upper Bavaria), Germany, a German firm No Drawing. Application February 27, 1950, Serial No. 146,636. In Germany June 20, 1949

1 Claim. (Cl. 260—559)

The present invention relates to a process for the purification of ortho-hydroxybenzamide.

Ortho-hydroxybenzamide, which can be produced by the reaction of an ester of ortho-hydroxybenzoic acid with aqueous ammonia, has heretofore been recovered by the evaporation of the ammoniacal reaction solution. In this way, however, the pure ortho-hydroxybenzamide is not obtained but rather a discolored product, which is contaminated with ortho-hydroxybenzoic acid and which can be purified only in a very inconvenient manner and with loss of yield.

The present invention is concerned with the problem of preparing the pure ortho-hydroxybenzamide, free from the aforesaid contaminating and discoloring by-products. This problem is solved by the expedient, according to the present invention, of selectively precipitating the desired pure ortho-hydroxybenzamide from the reaction solution in which it is formed. This selective precipitation is realized, according to the invention, by the establishment in the reaction solution of such a pH value that the desired pure ortho-hydroxybenzamide is precipitated therefrom, while the collaterally formed and undesired by-products are not precipitated, i. e. remain in solution. The precipitation of the ortho-hydroxybenzamide is effected by the addition of a suitable quantity of a strong or weak mineral acid or of an organic acid, from the class of acids: sulfuric acid, carbonic acid, and acetic acid, to the ammoniacal reaction solution until a pH within the range of 5 to 8 is established. In this way, the desired ortho-hydroxybenzamide is obtained in the form of an uncolored and uncontaminated product.

The following examples illustrate, but are not intended to restrict, the invention as precedingly set forth:

Example 1

1 kilogram of ortho-hydroxybenzoic acid methyl ester is stirred with 4 kilograms of 22 to 25% by weight aqueous ammonia for 16 to 20 hours, until the ester odor has disappeared. Then, while stirring and cooling, sulfuric acid (in the form of an aqueous solution of 50% concentration by weight) is added until the pH of the solution is between 5 and 8. A crystalline precipitate, in the form of white prismatic needles of ortho-hydroxybenzamide, separates out. The melting point of the separated product is 139–140° C., evidencing its purity, and the yield amounts to 90–95% of the theoretical.

Example 2

The procedure according to Example 1 is repeated except that in lieu of adding sulfuric acid, carbon dioxide is passed into the aqueous reaction mass according to the indicated pH is obtained. The pure product is again obtained.

Example 3

An aqueous solution of acetic acid (of about 35% concentration by weight) is added to the reaction mass according to Example 1, instead of the sulfuric acid there indicated. The pure ortho-hydroxybenzamide is again obtained as crystals melting at 139–140° C.

Having thus disclosed the invention, what is claimed is:

A process for the recovery and purification of ortho-hydroxybenzamide free from contaminants, from a reaction solution containing ortho-hydroxybenzamide methyl ester and aqueous ammonia which comprises adjusting the pH of said reaction solution with an acid of the group consisting of sulfuric acid, carbonic acid and acetic acid, to a pH range of 5 to 8 whereby the ortho-hydroxybenzamide formed as a result of said reaction is selectively precipitated in crystalline form free from contaminants.

PAUL RAMBACHER.
JOHANNES MIKSCH.

References Cited in the file of this patent

FOREIGN PATENTS

| Number | Country | Date |
|---|---|---|
| 65,599 | Netherlands | Apr. 15, 1950 |

OTHER REFERENCES

Kline, "J. Chem. Education," vol. 19, No. 7, July 1942, p. 332.